United States Patent
Jang et al.

(10) Patent No.: US 10,266,230 B2
(45) Date of Patent: Apr. 23, 2019

(54) FRICTIONAL RESISTANCE-REDUCING DEVICE AND SHIP INCLUDING SAME

(71) Applicant: SAMSUNG HEAVY INDUSTRIES CO., LTD., Seoul (KR)

(72) Inventors: Jin Ho Jang, Gyeongsangnam-do (KR); Su Heun Kwen, Gyeongsangnam-do (KR); Sang Min Kim, Gyeongsangnam-do (KR); Jin Kyu Kim, Gyeongsangnam-do (KR); Jin Hak Kim, Gyeongsangnam-do (KR); Dong Yeon Lee, Gyeongsangnam-do (KR); Jae Doo Lee, Gyeongsangnam-do (KR); Kwang Ho Jung, Gyeongsangnam-do (KR); Hee Sang Cho, Gyeongsangnam-do (KR); Soon Ho Choi, Gyeongsangnam-do (KR)

(73) Assignee: SAMSUNG HEAVY INDUSTRIES CO., LTD., Seoul (KR)

( * ) Notice: Subject to any disclaimer, the term of this patent is extended or adjusted under 35 U.S.C. 154(b) by 0 days.

(21) Appl. No.: 15/739,647

(22) PCT Filed: Jan. 20, 2016

(86) PCT No.: PCT/KR2016/000610
§ 371 (c)(1),
(2) Date: Dec. 22, 2017

(87) PCT Pub. No.: WO2017/003058
PCT Pub. Date: Jan. 5, 2017

(65) Prior Publication Data
US 2018/0186431 A1    Jul. 5, 2018

(30) Foreign Application Priority Data

Jun. 29, 2015  (KR) .................. 10-2015-0092110
Dec. 31, 2015  (KR) .................. 10-2015-0190952

(51) Int. Cl.
*B63B 1/38*     (2006.01)
*B63B 3/14*     (2006.01)
(Continued)

(52) U.S. Cl.
CPC .................. *B63B 1/38* (2013.01); *B63B 3/14* (2013.01); *B63B 19/00* (2013.01); *B63B 59/04* (2013.01);
(Continued)

(58) Field of Classification Search
CPC .............. B63B 59/04; B63B 1/38; B60V 3/06
See application file for complete search history.

(56) References Cited

U.S. PATENT DOCUMENTS 4,214,332 A * 7/1980 Stoner ..................... B63B 3/00
                                                        114/356
5,575,232 A * 11/1996 Kato ........................ B63B 1/38
                                                        114/67 A
(Continued)

FOREIGN PATENT DOCUMENTS

EP    0903287 A2    3/1999
JP    H1035578 A    2/1998
(Continued)

OTHER PUBLICATIONS

Japan Intellectual Property Office, Office Action for Japanese Patent Application No. 2017-567181, dated Oct. 1, 2018, 5 pages.
(Continued)

*Primary Examiner* — S. Joseph Morano
*Assistant Examiner* — Jovon E Hayes
(74) *Attorney, Agent, or Firm* — SoCal IP Law Group LLP; Mark A. Goldstein

(57) ABSTRACT

A frictional resistance-reducing device and a ship including the same are disclosed. The ship comprises: an outer panel including and air outlet; a plurality of reinforcement mem-
(Continued)

bers provided on the inner surface of the outer panel so as to be spaced from each other; and a frictional resistance-reducing device formed on the inner surface of the out panel between immediately neighboring reinforcement members among the plurality of reinforcement members, so as to cover the air outlet, wherein the frictional resistance-reducing device includes: a hollow housing of which one surface is opened; and an air inlet formed in the housing, and the opened one surface faces the air outlet.

14 Claims, 16 Drawing Sheets

(51) Int. Cl.
  *B63B 19/00* (2006.01)
  *B63B 59/04* (2006.01)
(52) U.S. Cl.
  CPC ....... *B63B 2001/387* (2013.01); *Y02T 70/122* (2013.01)

(56) References Cited

U.S. PATENT DOCUMENTS

| | | | | |
|---|---|---|---|---|
| 6,145,459 A * | 11/2000 | Takahashi | ........ | B63B 1/38 114/67 A |
| 6,186,085 B1 * | 2/2001 | Kato | ........ | B63B 1/38 114/67 A |
| 6,748,891 B2 * | 6/2004 | Takahashi | ........ | B63B 1/38 114/67 A |
| 7,044,073 B2 * | 5/2006 | Goldstein | ........ | B63B 1/34 114/67 A |
| 7,219,614 B2 * | 5/2007 | Stubblefield | ........ | B63B 1/38 114/67 A |
| 8,196,536 B1 * | 6/2012 | Harbin | ........ | B63B 1/34 114/67 A |
| 8,327,784 B2 * | 12/2012 | Costas | ........ | B63B 1/38 114/67 A |
| 8,677,918 B2 * | 3/2014 | Harbin | ........ | B63B 1/38 114/67 A |
| 8,763,547 B2 * | 7/2014 | Costas | ........ | F04F 5/54 114/67 A |
| 9,376,167 B2 * | 6/2016 | Kawashima | ........ | B63B 1/38 |
| 2002/0014192 A1 * | 2/2002 | Takahashi | ........ | B63B 1/38 114/67 A |
| 2008/0083361 A1 * | 4/2008 | Iglesias Schoo | ........ | B63B 1/38 114/67 A |
| 2008/0149015 A1 * | 6/2008 | Carbonel | ........ | B63B 13/00 114/289 |
| 2014/0331912 A1 * | 11/2014 | Wu | ........ | C09D 5/1693 114/67 A |

FOREIGN PATENT DOCUMENTS

| | | | | |
|---|---|---|---|---|
| JP | H11-027675 A | | 1/1999 | |
| JP | 2000128063 A | | 5/2000 | |
| JP | 2000128063 A | * | 5/2000 | |
| JP | 2008120246 A | | 5/2008 | |
| JP | 2008143345 A | | 6/2008 | |
| JP | 2014125033 A | | 7/2014 | |
| JP | 2015-081043 A | | 4/2015 | |
| JP | 2015081043 A | | 4/2015 | |
| JP | 2015081043 A | * | 4/2015 | ............ B63B 1/38 |
| KR | 100441723 B1 | | 7/2004 | |
| KR | 101278754 B1 | | 6/2013 | |
| WO | 2013/002182 A1 | | 1/2013 | |
| WO | 2017003058 A1 | | 1/2017 | |

OTHER PUBLICATIONS

World Intellectual Property Organization, International Search Report for international application No. PCT/KR2016/000610, dated Apr. 8, 2015, 5 total pages.

European Intellectual Property Office, Search Report for European Application No. 16818091.7, dated Dec. 20, 2018, 8 pages.

* cited by examiner

FRICTIONAL RESISTANCE-REDUCING DEVICE AND SHIP INCLUDING SAME

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/KR2016/000610, filed Jan. 20, 2016 entitled, "FRICTIONAL RESISTANCE-REDUCING DEVICE AND SHIP INCLUDING SAME", which claims priority to Korean Patent Application Nos. 10-2015-0092110, filed Jun. 29, 2015, and 10-2015-0190952, filed Dec. 31, 2015 all of which are incorporated herein by reference in their entirety.

BACKGROUND

Frictional resistance is generated at a hull of a sailing ship due to water. The frictional resistance is proportional to a submerged area of a hull submerged under water. A ship, especially a large ship, has a hull with a flat bottom surface. The bottom surface is a large portion of a surface area of the hull submerged under water.

An air layer may be formed at the bottom surface by air being discharged toward the bottom surface in order to reduce frictional resistance applied to the bottom surface. Specifically, air is supplied to a chamber installed on the bottom surface of the hull, and the air supplied to the chamber may be discharged toward the bottom surface through a plurality of air discharge ports provided at a lower portion of the chamber.

Technical Problem

A hull has a reinforcement member installed at a bottom surface thereof in a longitudinal direction or a transverse direction to have sufficient structural strength. However, a chamber installed at the bottom surface may have a relatively large size. Therefore, while a large chamber is installed at the bottom surface, the reinforcement member should be removed or changed. Therefore, it is hard to maintain structural strength of the hull according to a design.

The present invention is directed to providing a frictional resistance-reducing device installed on a bottom surface of a hull while maintaining structural strength of a hull.

The present invention is directed to providing a ship in which the frictional resistance-reducing device is installed.

Objects of the present invention are not limited to the above-described objects and other objects that have not been described should be understood by those skilled in the art from the following description.

Technical Solution

One aspect of the present invention provides a ship which includes an outer panel including an air outlet, a plurality of reinforcement members installed on an inner surface of the outer panel to be separated from each other, and a frictional resistance-reducing device formed between immediately adjacent reinforcement members among the plurality of reinforcement members on the inner surface of the outer panel to cover the air outlet, wherein the frictional resistance-reducing device includes a housing having a hollow shape with one surface that is open, and an air inlet formed in the housing, and the one open surface faces the air outlet.

The air outlet may include a plurality of air outlets, the housing may be perpendicularly coupled to the inner surface of the outer panel, the air inlet may be formed in the other surface or a side surface of the housing, and the plurality of air outlets may be disposed in the outer panel at regular intervals with respect to a virtual line in a circumferential direction.

The housing may include a body unit having a hollow shape with both side surfaces open, and one of the surfaces thereof perpendicularly coupled to the inner surface of the outer panel, and a cover unit having an air inlet formed in the center thereof and configured to cover the other surface of the body unit.

The body unit and the cover unit may be coupled to each other through a flange or welding.

The cover unit may be a blocking valve configured to prevent water outside a hull from being introduced into the hull.

The body unit may include a large diameter part having a cylinder shape, a small diameter part having a cylinder shape with a diameter relatively smaller than that of the large diameter, and a diameter changing part configured to connect the large diameter part with the small diameter part.

The housing may have a regular polygon-shaped cross section, and the number of the plurality of air outlets may be provided to be the same as that of sides of the regular polygon-shaped cross section of the housing.

The housing may have a rectangular cross section and be perpendicularly coupled to the inner side surface of the outer panel, the air inlet may be formed in the center of the other surface of the housing, and a plurality of air outlets may be disposed at an edge of the housing and positioned to be perpendicular to the outer panel at a regular distance from a virtual line.

The housing may include a plurality of housings, and the plurality of housings may be disposed in a longitudinal direction of the reinforcement member or a direction perpendicular to the longitudinal direction of the reinforcement member.

A specific area of the outer panel facing the one open surface of the housing may include a base unit having a through hole connected with an inside of the housing, and a door unit coupled to the base unit to open and close the through hole.

The air outlet may be formed in at least one location among the door unit, the base unit, and a boundary between the base unit and the door unit.

The door unit may be coupled with the base unit through a bolt.

The door unit may be hinge-coupled to the base unit to rotate toward the inside of the housing.

A boundary part of the door unit and a boundary part of the through hole may have a tapered shape to prevent the door unit from rotating outside the housing.

Another aspect of the present invention provides a frictional resistance-reducing device which includes a housing having a hollow shape with one surface that is open, and an air inlet formed at one side of the housing, wherein the one open surface of the housing may be installed to face an inner surface of an outer panel, reinforcement members reinforcing the outer panel may be disposed on both sides of the outer panel, and the housing may cover an air outlet installed in the outer panel.

The housing may include a body unit having a hollow shape with both side surfaces open and having one of the surfaces thereof perpendicularly coupled to the inner surface of the outer panel, and a cover unit having an air inlet formed in the center thereof and configured to cover the other surface of the body unit.

A specific area of the outer panel facing the one open surface of the housing may include a base unit having a through hole connected with an inside of the housing, and a door unit coupled to the base unit to open or close the through hole.

The housing may include an antifouling device installed therein.

Details of other embodiments are included in the detailed description and the accompanying drawings.

Advantageous Effects

A ship according to some embodiments of the present invention can prevent structural strength thereof from being degraded by having a housing installed between a pair of immediately adjacent reinforcement members. Therefore, an additional process for reinforcing a structure of a hull can be omitted, and thus costs and time for manufacturing and installation can be reduced.

A ship according to some embodiments of the present invention includes a through hole formed in a predetermined area of an outer panel facing one open surface of a housing, and the through hole can be opened or closed via a door unit. Thus, a worker can easily perform maintenance work on the inside of the housing.

DETAILED DESCRIPTION

Figure 1:
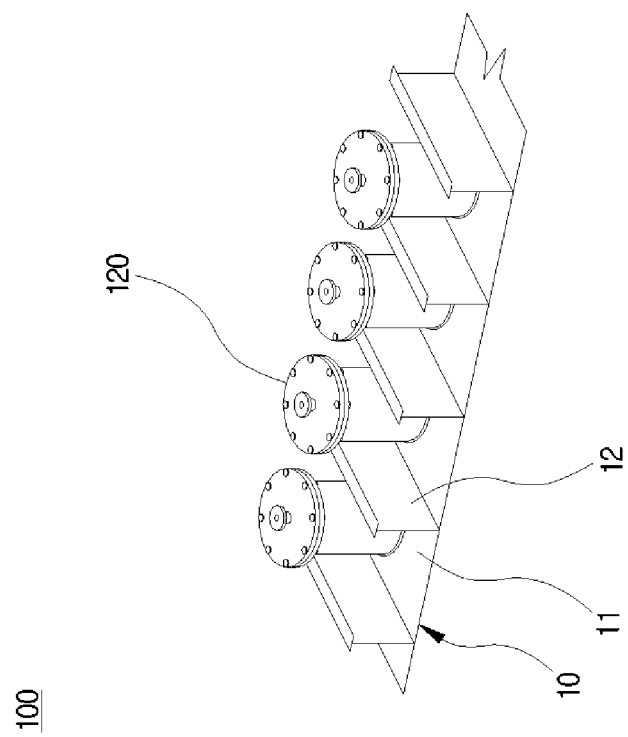
FIG. 1 is a view showing a frictional resistance-reducing device according to some embodiments of the present invention.

Exemplary embodiments of the present invention will be illustrated in the drawings and described in detail in the written description, but the embodiments may be changed and have many alternative forms. However, the present invention is not limited to particular modes of practice, and it should be appreciated that all changes, equivalents, and substitutes not departing from the spirit and technical scope of embodiments are encompassed in embodiments. In the description of the embodiments, certain detailed descriptions of a related art will be omitted when it is deemed that they unnecessarily obscure the essence of the inventive concept.

Hereinafter, embodiments of the present invention will be described in detail with reference to the accompanying drawings. When describing the invention with reference to the accompanying drawings, the same or similar elements are designated with the same numeral references, and redundant descriptions thereof will be omitted.

Figure 2:
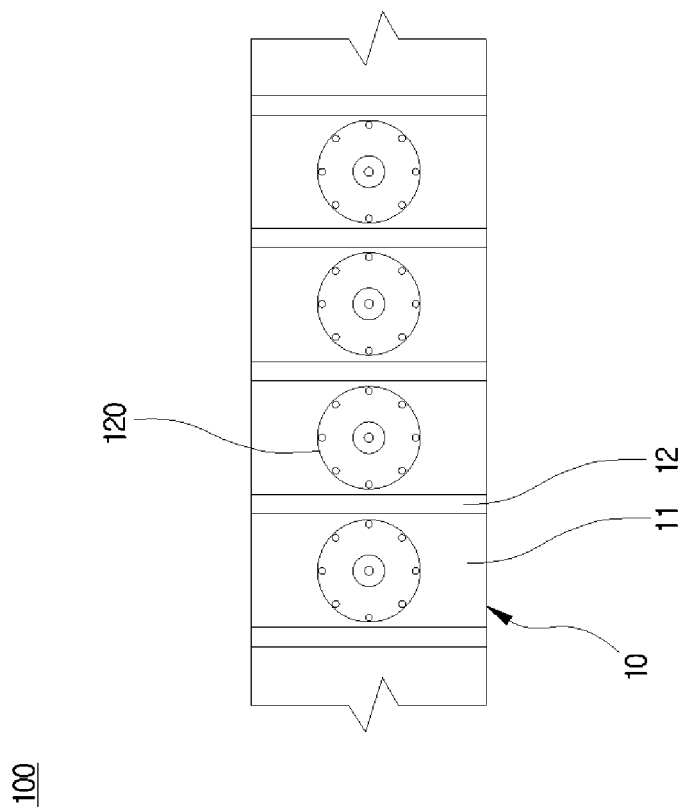
FIG. 2 is a view of the frictional resistance-reducing device of FIG. 1 viewed from above.

FIG. 1 is a view showing a frictional resistance-reducing device according to some embodiments of the present invention, and FIG. 2 is a view of the frictional resistance-reducing device of FIG. 1 viewed from above.

Referring to FIGS. 1 and 2, a frictional resistance-reducing device 100 according to some embodiments of the present invention may reduce frictional resistance relative to a hull 10 by discharging air toward a surface of the hull 10 to form an air layer on the surface of the hull 10.

The hull 10 includes an outer panel 11. The outer panel 11 includes a horizontal outer panel of a ship bottom and an inclined or vertical outer panel of a ship side. Hereinafter, in the embodiment, it is assumed that the outer panel 11 is an outer panel of the ship bottom, but the outer panel 11 is not limited thereto. For reference, in FIG. 1, an upper side of the outer panel 11 of the hull 10 represents an inner side of the outer panel 11, and a lower side of the outer panel 11 of the hull 10 represents an outer side of the outer panel 11.

A plurality of reinforcement members 12 are separately installed on the inner side of the outer panel 11. The reinforcement members 12 are designed so that the hull 10 has sufficient structural strength. The reinforcement members 12 have a T-shaped or L-shaped cross section, but are not limited thereto.

The frictional resistance-reducing device 100 according to some embodiments of the present invention is installed between immediately adjacent reinforcement members 12 of the plurality of reinforcement members 12 installed on the hull 10.

Figure 3:
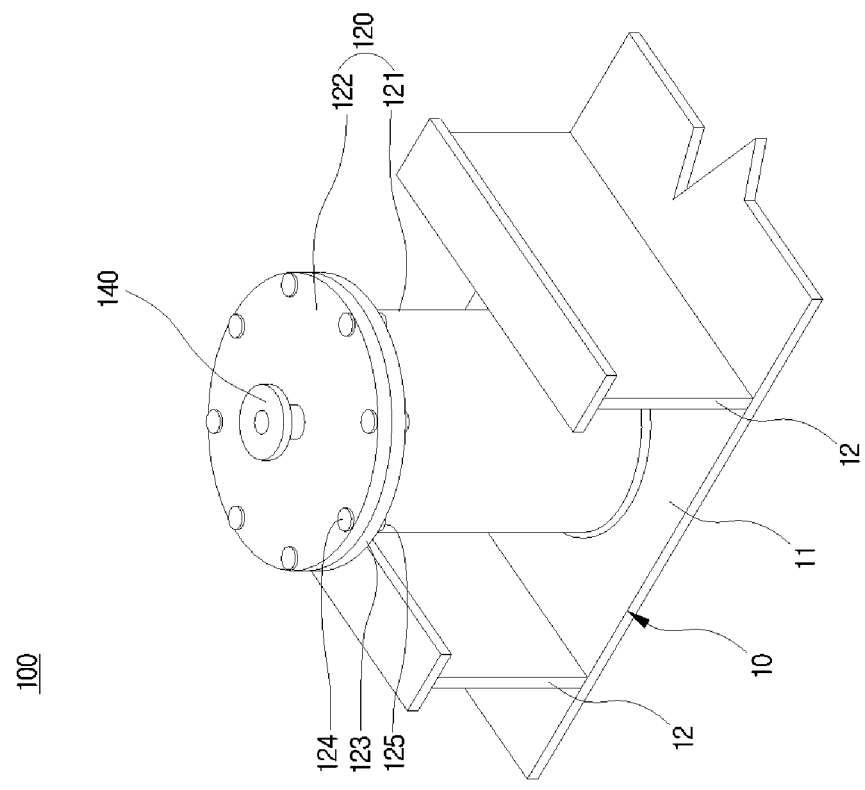
FIG. 3 is a perspective view of a frictional resistance-reducing device according to a first embodiment of the present invention.
Figure 4:
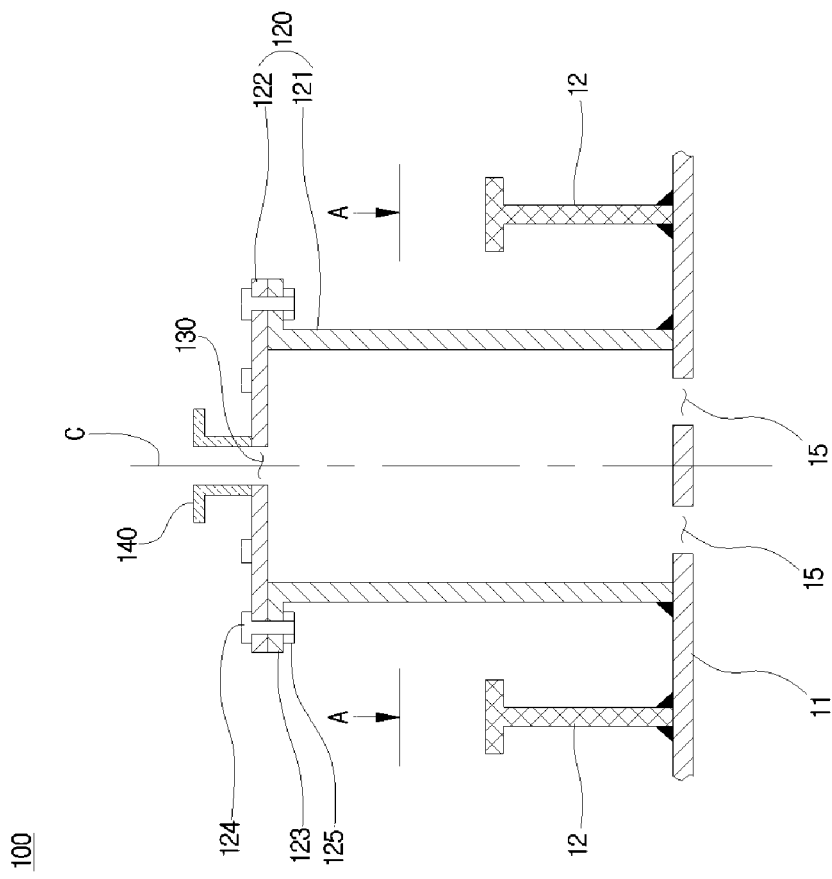
FIG. 4 is a cross-sectional view of the frictional resistance-reducing device according to the first embodiment of the present invention.
Figure 5:
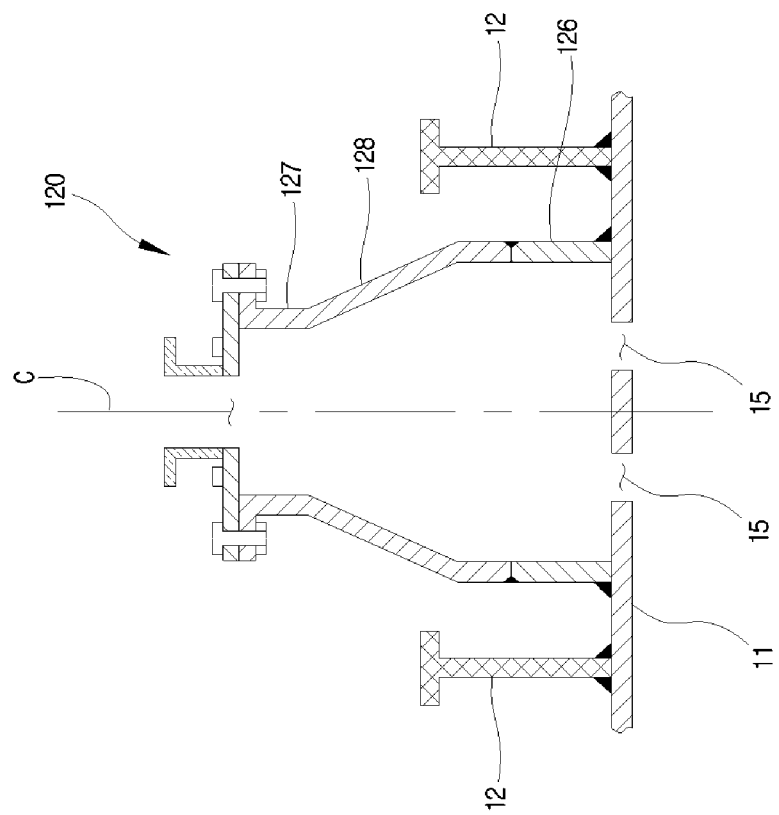
FIG. 5 is a view showing one modified example of a housing of FIG. 4.
Figure 6:
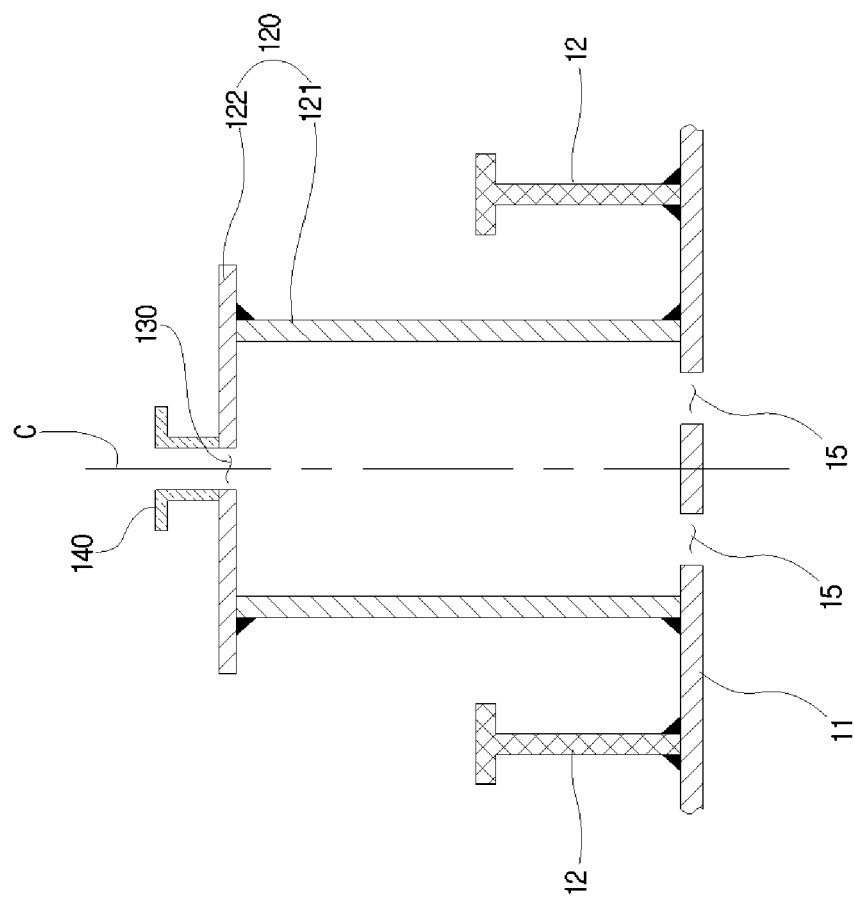
FIG. 6 is a view showing another modified example of the housing of FIG. 4.

FIG. 3 is a perspective view of a frictional resistance-reducing device according to a first embodiment of the present invention, FIG. 4 is a cross-sectional view of the frictional resistance-reducing device according to the first embodiment of the present invention, FIG. 5 is a view showing one modified example of a housing of FIG. 4, and FIG. 6 is a view showing another modified example of the housing of FIG. 4.

First, referring to FIGS. 3 and 4, a frictional resistance-reducing device 100 according to the first embodiment of the present invention includes a housing 120 and an air inlet 130.

The housing 120 covers an air outlet 15 formed in the outer panel 11. The air outlet 15 covered by the housing 120 is located between the adjacent reinforcement members 12 of the reinforcement members 12 installed on the outer panel 11. The air outlet 15 may be formed to pass through the outer panel 11.

The air outlet 15 discharges air to the outside of the outer panel 11. The air discharged through the air outlet 15 forms an air layer along an outer surface of the outer panel 11. The air layer may reduce frictional resistance relative to the hull 10.

The air outlet 15 may extend in a direction perpendicular to the outer panel 11. Although not shown, the air outlet 15 may extend to be inclined relative to the outer panel 11.

A discharge direction of the air discharged from the air outlet may be determined depending on a formation direction of the air outlet 15. For example, the formation direction of the air outlet may be experimentally and experientially determined to efficiently form an air layer.

The air outlet 15 may include a plurality of air outlets. In this case, the housing 120 may cover the plurality of air outlets 15.

The housing 120 may have a hollow shape with one surface that is open. For example, the housing 120 may have a circular cross section.

For example, as shown in FIG. 4, the housing 120 may have a circular cylinder shape with a vertically uniform diameter.

Alternatively, as shown in FIG. 5, the housing 120 may include a large diameter part 126, a small diameter part 127, and a diameter changing part 128. The large diameter part 126 may have a cylinder shape with a predetermined diameter. The small diameter part 127 may have a cylinder shape with a diameter relatively smaller than that of the large diameter part 126. The diameter changing part 128 connects the large diameter part 126 with the small diameter part 127 and has a cone shape with a diameter smaller in an inward direction of the outer panel 11.

Although not shown, the housing may be configured of only a large diameter part or only a cone-shaped diameter changing part. Further, the housing may have a curved-pipe shape. In addition, the housing may have a hollow form with a circular cross section and various shapes.

Referring to FIGS. 3 and 4, the air inlet 130 is formed at one side of the housing 120. For example, the air inlet 130 is formed at the other surface of the housing 120.

The housing 120 is disposed so that the one open surface between the pair of reinforcement members 12 covers the plurality of air outlets 15. The housing 120 functions as a type of chamber.

When the housing 120 functioning as a chamber is disposed between the pair of reinforcement members 12, it is not necessary for the reinforcement members installed on the outer panel 11 to be removed or changed, and thus structural strength of the hull 10 for a design is not degraded.

The housing 120 disposed as described above may be treated as fittings in accordance with a regulation of a ship's classification. In this case, an additional process for reinforcing a structure generated when the housing 120 is treated as a part of the hull 10 may be omitted. Therefore, costs and time for manufacturing and installing the housing 120 may be reduced.

The housing 120 is coupled to the inner surface of the outer panel 11. In this case, the housing 120 may be coupled to the inner surface of the outer panel 11 through welding. The housing 120 may be perpendicularly coupled to the inner surface of the outer panel 11.

Meanwhile, the housing 120 may include a body unit 121 and a cover unit 122.

The body unit 121 has a hollow shape with both surfaces open. For example, as shown in FIG. 4, the body unit 121 may have a circular cylinder shape.

The body unit 121 is perpendicularly coupled to the inner surface of the outer panel 11 so that the one of the open surfaces covers the plurality of air outlets 15. The cover unit 122 covers the other open surface of the body unit 121.

The cover unit 122 may be separately manufactured and coupled to the body unit 121.

For example, the body unit 121 may be coupled with the cover unit 122 through a flange. In this case, the flange 123 is formed at an end of the body unit 121 to which the cover unit 122 is coupled, and the cover unit 122 is coupled to the flange of the body unit 121 through a bolt 124 and a nut 125. In this case, although not shown, a sealing member may be interposed between the cover unit 122 and the flange 123.

Alternatively, the body unit 121 and the cover unit 122 may be coupled and welded to each other, as shown in FIG. 6.

Meanwhile, although not shown, the housing may have a body unit and a cover unit integrally coupled with each other.

Referring to FIG. 4, the air inlet 130 may be formed at the other surface of the housing 120 (or the cover unit 122). In this case, the air inlet 130 may be formed in the center of the other surface of the housing 120, but the air inlet 130 is not limited thereto.

For example, the air inlet 130 may be formed at one side of the other surface of the housing 120. The air inlet 130 may be formed in a side wall (that is, the body unit 121) of the housing 120. Further, there may be two or more air inlets 130. For example, at least two air inlets 130 may be formed in the other surface of the housing 120, may be formed in both side walls thereof, and may be formed in the other surface and the side wall.

In this case, a connection unit 140 connected with the air inlet 130 may be formed on the housing 120. The connection unit 140 may have a flange form. The connection unit 140 is connected with an air supply line (not shown) supplying air generated by an air supply source (not shown). A blocking valve (not shown) may be interposed between the connection unit 140 and the air supply line (not shown) to prevent water outside the hull from being introduced into the hull.

Alternatively, although not shown, the air inlet may be directly connected to the air supply line without the connection unit. In this case, the blocking valve may be installed in the air supply line to prevent the water outside the hull from being introduced into the hull.

The air inlet 130 provides a path through which air supplied through the air supply line (not shown) is introduced into the housing 120. The air introduced into the housing 120 may be discharged to the outside of the outer panel 11 through the plurality of air outlets 15.

Meanwhile, although not shown, the cover unit may be the blocking valve. That is, the blocking valve may be substitute for the cover unit. In this case, the blocking valve may be installed to cover the other surface of the body unit. In this case, the blocking valve may be coupled to the other surface of the body unit via a flange.

The blocking valve is connected to the air supply line. The blocking valve allows air to flow into the housing when the blocking valve is opened.

The blocking valve prevents the water outside the hull from being introduced into the hull when the blocking valve is closed. For example, when operation of the frictional resistance-reducing device according to the embodiment of the present invention is stopped, the blocking valve is closed to block the water outside the hull from flowing into the hull backward.

Figure 7:
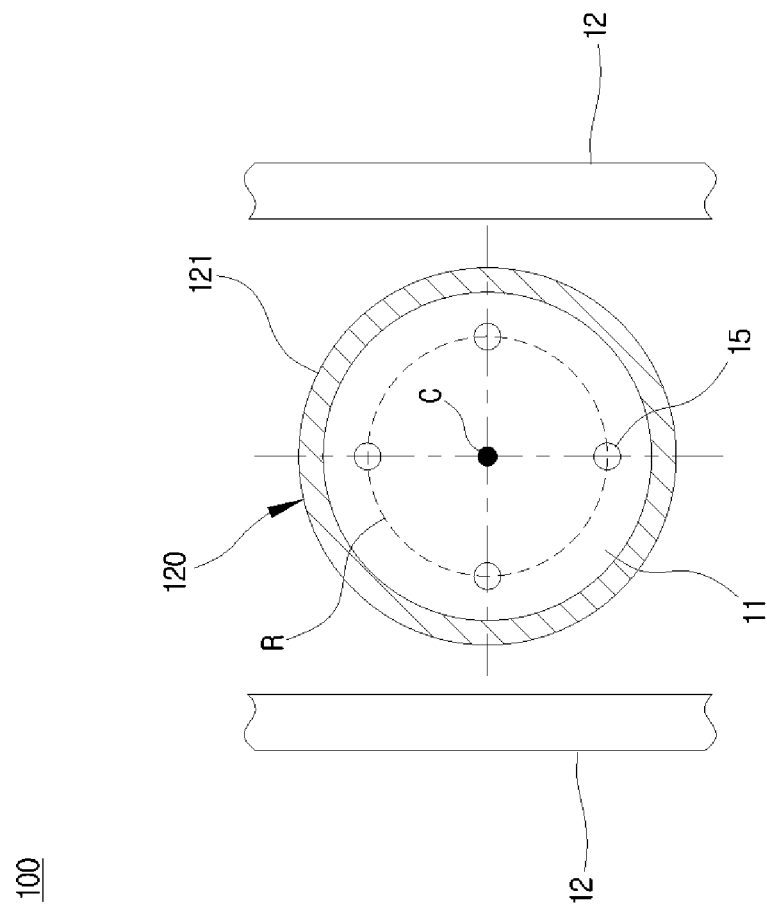
FIG. 7 is a cross-sectional view taken along line A-A of FIG. 4.

FIG. 7 is a cross-sectional view taken along line A-A of FIG. 4.

Referring to FIG. 7, the plurality of air outlets 15 that the housing 120 covers are formed in the outer panel 11 between the pair of adjacent reinforcement members 12. For reference, although FIG. 7 shows the housing 120 covering the four air outlets 15, the example is illustrative in purpose only. The number of air outlets 15 may be determined in consideration of a size of the hull 10 or an effect of discharging air.

When the housing 120 is perpendicularly coupled to the outer panel 11 and the air inlet 130 is formed in the center of the other surface of the housing 120, a virtual line C (see FIGS. 4 and 7) passing through the center of the air inlet 130 may be formed to be perpendicular to the outer panel 11.

Further, FIG. 4 shows that the virtual line C passes through the air inlet 130, but the virtual line C is not limited thereto. As described above, the air inlet 130 may be disposed at a side wall of the housing 120, and there may be two or more air inlets 130.

The plurality of air outlets 15 may be disposed in a circumferential direction with respect to the virtual line C at regular intervals.

In other words, as shown in FIG. 7, centers of the air outlets 15 are disposed on a virtual circle R with a predetermined radius with respect to the virtual line C and have regular intervals.

In this case, the plurality of air outlets 15 have a structure symmetrical with respect to the virtual line C, and air introduced through the air inlet 130 and moving along the virtual line C may be uniformly discharged toward the outer panel 11 through the plurality of air outlets 15 with the symmetrical structure.

The air uniformly discharged through the plurality of air outlets forms an optimal air layer on the surface of the hull 10 or is maintained to reduce the frictional resistance relative to the hull 10. Meanwhile, referring to FIGS. 1 and 2, the frictional resistance-reducing device 100 may include a plurality of housings 120. In this regard, the plurality of air outlets (not shown) are formed in the outer panel 11 to pass therethrough. The plurality of air outlets formed in the outer panel 11 may be distributed in at least one direction of a longitudinal direction of the reinforcement member 12 and a direction perpendicular to the longitudinal direction of the reinforcement member 12.

In this case, the plurality of housings 120 may be separately distributed in at least one direction of the longitudinal direction of the reinforcement member 12 and the direction perpendicular to the longitudinal direction of the reinforcement member 12 to cover at least one of the plurality of air outlets formed on the outer panel 11.

The plurality of housings 120 are disposed in the direction perpendicular to the longitudinal direction of the reinforcement members 12 and, as shown in FIG. 2, each of the housings 120 is disposed between a pair of adjacent reinforcement members among the reinforcement members 12, or, although not shown, a plurality of housings 120 may be disposed between a pair of adjacent reinforcement members.

Figure 8:
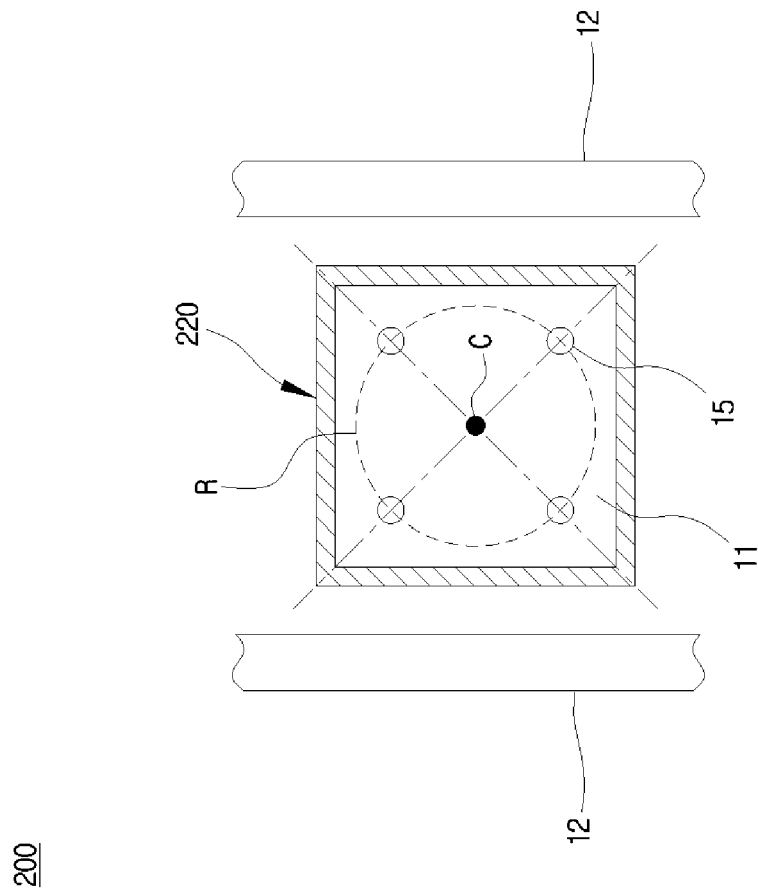
FIG. 8 is a view for describing a frictional resistance-reducing device according to a second embodiment of the present invention.

FIG. 8 is a view for describing a frictional resistance-reducing device according to a second embodiment of the present invention, and for convenience of description, the following description will focus on differences with descriptions based on FIGS. 1 to 7.

Referring to FIG. 8, in a frictional resistance-reducing device 200 according to the second embodiment of the present invention, a housing 220 may be provided in a hollow shape with a regular polygon-shaped cross section. For example, the cross section of the housing 220 may include a regular polygon, as shown in FIG. 8, but this shape is illustrative in purpose only, and the housing 220 may have various regular polygon-shaped cross sections.

The housing 220 has one surface that is open and has an air inlet (not shown) formed in the center of the other surface thereof.

The housing 220 may be disposed so that the one open surface between a pair of reinforcement members 12 covers the plurality of air outlets 15. The housing 220 may be perpendicularly coupled to an inner surface of the outer panel 11.

In this case, the number of the plurality of air outlets 15 that the housing 220 covers may be provided to be the same as the number of sides of the regular polygon-shaped cross section of the housing 220. For example, when the housing 200 has a square-shaped cross section, as shown in FIG. 8, the four air outlets 15 that the housing 220 covers may be provided.

The plurality of air outlets 15 are disposed to be perpendicular to the outer panel 11 at regular intervals about a virtual line C in a circumferential direction. In this case, air introduced into the housing 220 through an air inlet (not shown) may be uniformly discharged toward the outer panel 11 through the air outlets 15.

Although not shown, like the housing 120 shown in FIG. 5, the housing may include a large area part, a small area part, and an area changing part. In this case, the large area part may have a predetermined area and may be disposed to cover the air outlet 15, and the small area part may have a relatively smaller area than the large area part. The area changing part may connect the large area part with the small area part and may be provided to have an area smaller toward an inward direction of the outer panel.

Figure 9:
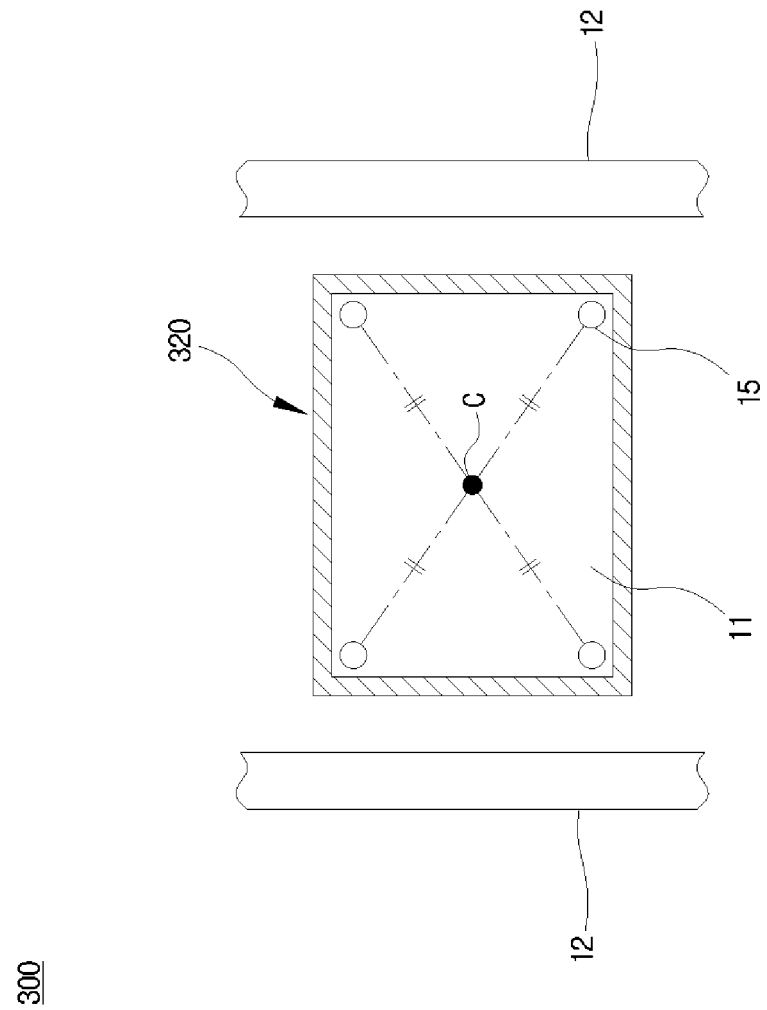
FIG. 9 is a view for describing a frictional resistance-reducing device according to a third embodiment of the present invention.

FIG. 9 is a view for describing a frictional resistance-reducing device according to a third embodiment of the present invention. For convenience of description, the following description will focus on differences with descriptions based on FIGS. 1 to 7.

Referring to FIG. 9, in a frictional resistance-reducing device 300 according to the third embodiment of the present invention, a housing 320 may have a rectangular cross section and a hollow shape. The housing 320 has one surface that is open and an air inlet (not shown) formed in the center of the other surface thereof.

The number of the plurality of air outlets 15 that the housing 320 covers may be four, which is the same number of sides of the rectangular cross section of the housing 320. In this case, the plurality of air outlets 15 may be disposed on an edge of the housing 320.

The plurality of air outlets 15 are positioned to be perpendicular to the outer panel 11 at the same distance from a virtual line C. In this case, the plurality of air outlets 15 may have a structure symmetrical with respect to the center of the virtual line C. When the air outlets 15 are disposed as described above, air introduced into the housing 320 through an air inlet (not shown) may be uniformly discharged toward the outer panel 11 through the air outlets 15.

Although not shown, like the housing 120 shown in FIG. 5, the housing may include a large area part, a small area part, and an area changing part.

Figure 10:
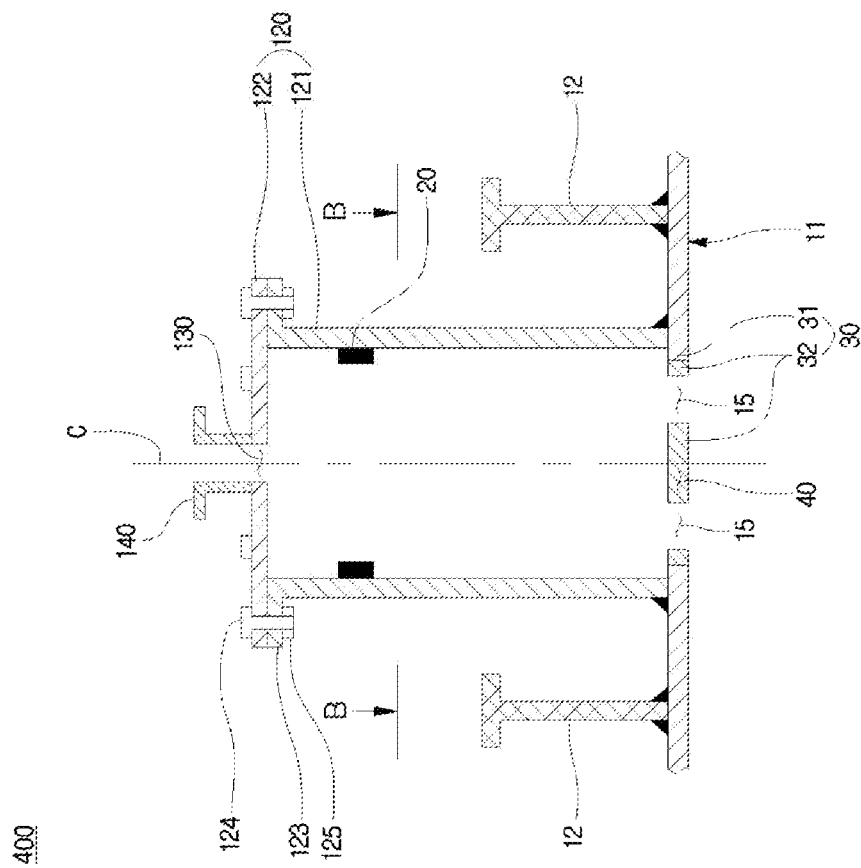
FIG. 10 is a cross-sectional view of a frictional resistance-reducing device according to a fourth embodiment of the present invention.
Figure 11:
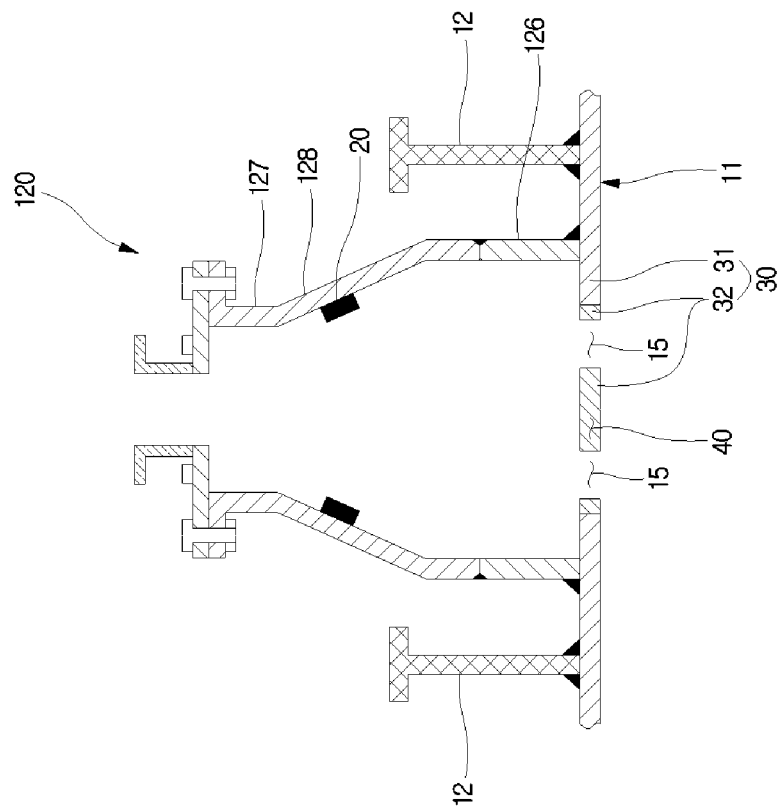
FIG. 11 is a view showing one modified example of a housing of FIG. 10.
Figure 12:
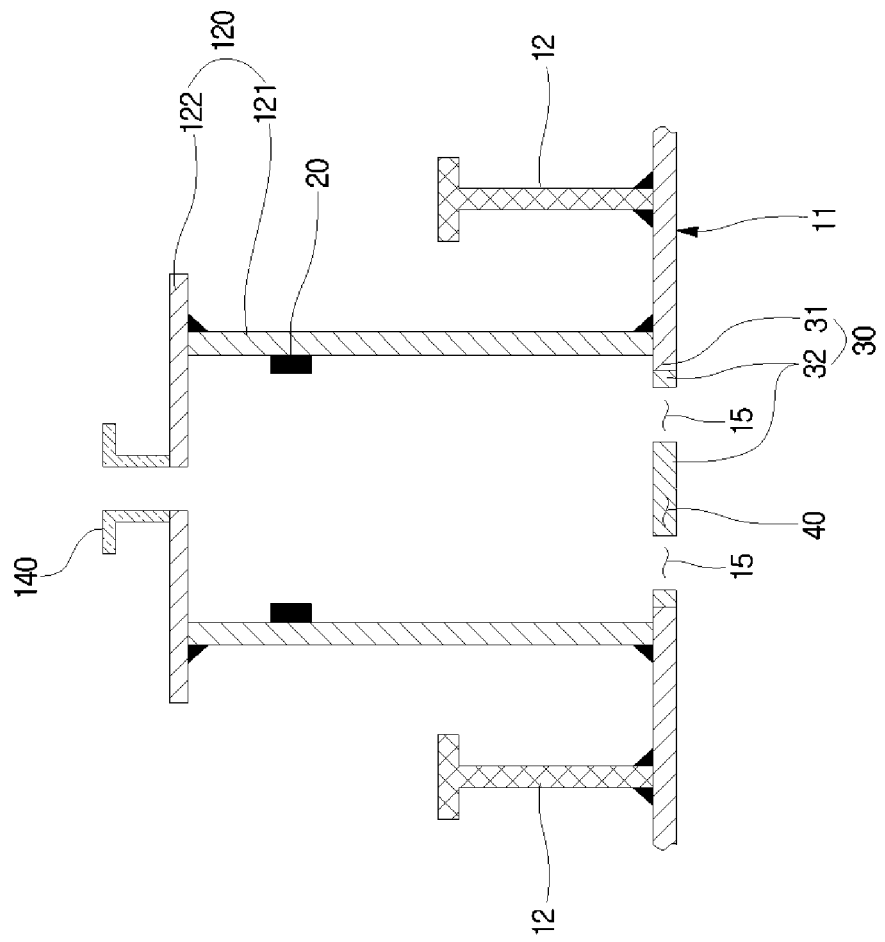
FIG. 12 is a view showing another modified example of the housing of FIG. 10.
Figure 13:
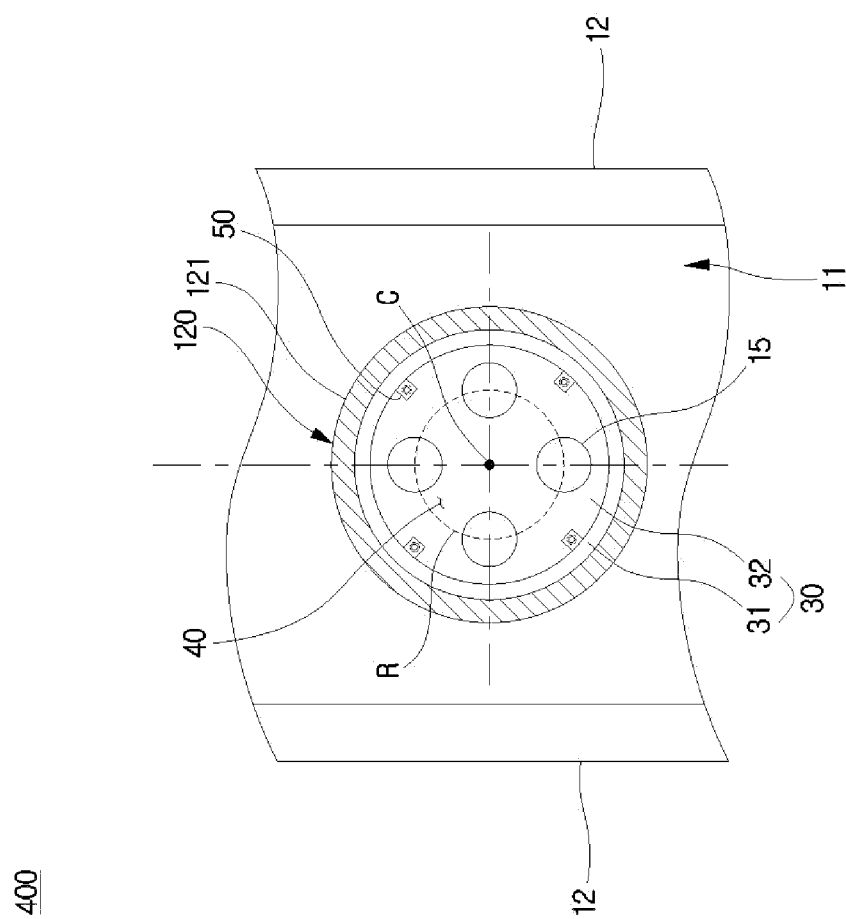
FIG. 13 is a cross-sectional view taken along line B-B of FIG. 10.

FIG. 10 is a cross-sectional view of a frictional resistance-reducing device according to a fourth embodiment of the present invention, FIG. 11 is a view showing one modified example of a housing of FIG. 10, FIG. 12 is a view showing another modified example of the housing of FIG. 10, and FIG. 13 is a cross-sectional view taken along line B-B of FIG. 10. For convenience of description, the following description will focus on differences with descriptions based on FIGS. 1 to 7.

First, referring to FIGS. 10 and 13, a frictional resistance-reducing device 100 according to the fourth embodiment of the present invention includes a housing 120 and an air inlet 130.

The housing 120 covers the air outlet 15 formed on the outer panel 11. The air outlet 15 that the housing 120 covers is located between a pair adjacent of reinforcement members 12 among the reinforcement members 12 installed on the outer panel 11. The air outlet 15 may be formed to pass through the outer panel 11.

Air is discharged to the outside of the outer panel 11 through the air outlet 15. The air discharged through the air outlet 15 forms an air layer along an outer surface of the outer panel 11. The air layer may reduce frictional resistance relative to the hull 10.

An antifouling device may be installed in the housing 120. For example, the antifouling device may include an anode 20.

The housing 120 may have a hollow shape with one surface that is open. In this case, the housing 120 may have a circular cross section. For example, as shown in FIG. 10, the housing 120 may have a circular cross section. For example, as shown in FIG. 10, the housing 120 may have a circular cylinder shape with a predetermined diameter in a vertical direction.

Alternatively, as shown in FIG. 11, the housing 120 may include a large diameter part 126, a small diameter part 127, and a diameter changing part 128.

Referring to FIGS. 10 and 13, the housing 120 may include an air inlet 130. For example, as shown in FIG. 10, the air inlet 130 may be formed on the other surface facing the one open surface of the housing 120. Although not shown, the air inlet 130 may be formed in a lateral surface that does not face the one open surface of the housing 120.

The housing 120 is coupled to the inner surface of the outer panel 11.

The housing 120 may include a body unit 121 and a cover unit 122.

The body unit 121 has a hollow shape with both surfaces open. The body unit 121 is perpendicularly coupled to the inner surface of the outer panel 11 so that the one of the open surfaces covers the plurality of air outlets 15. The cover unit 122 covers the other open surface of the body unit 121.

The cover unit 122 may be separately manufactured and may be coupled to the body unit 121.

For example, the body unit 121 and the cover unit 122 may be coupled through a flange.

Alternatively, the body unit 121 and the cover unit 122 may be coupled through welding, as shown in FIG. 12.

Meanwhile, although not shown, the housing may include a body unit and an cover unit that are integrally formed.

Referring to FIGS. 10 and 13, a specific area 30 of the outer panel 11 facing the one open surface of the housing 120 may include a base unit 31 and a door unit 32.

A through hole 40 connected with the inside of the housing 120 may be formed in the base unit 31. A worker may perform work on the inside of the housing 120 through the through hole 40 formed in the base unit 31. For example, the worker may use the through hole 40 formed in the base unit 31 to replace the anode 20 in the housing 120. In addition, the worker may easily perform maintenance and repair work on the inside of the housing 120 through the through hole 40.

The through hole 40 may have a circular shape, as shown in FIG. 13, but is not limited thereto.

The door unit 32 opens or closes the through hole 40. The air outlets 15 may be formed on the door unit 32.

The door unit 32 may be coupled to the base unit 31.

For example, the door unit 32 may be coupled to the base unit 31 through a bolt, as shown in FIG. 13. In this case, a support unit 50 extending in a direction toward the center of the through hole 40 may be formed on the base unit 31. The door unit 32 may be coupled to the support unit 50 via a bolt.

An insertion groove (not shown) into which a head of the bolt is inserted so that the bolt is not exposed to the outside may be formed in the door unit 32.

A plurality of support units 50 may be provided, as shown in FIG. 13. The plurality of support units 50 may be formed in a radial direction relative to the through hole 40. Although not shown, the support unit may have a ring shape as a single member.

The support unit 50 may be disposed in the housing 120, as shown in FIG. 13. In this case, a portion exposed to the outside of the outer panel 11 may be minimized.

Figure 14:
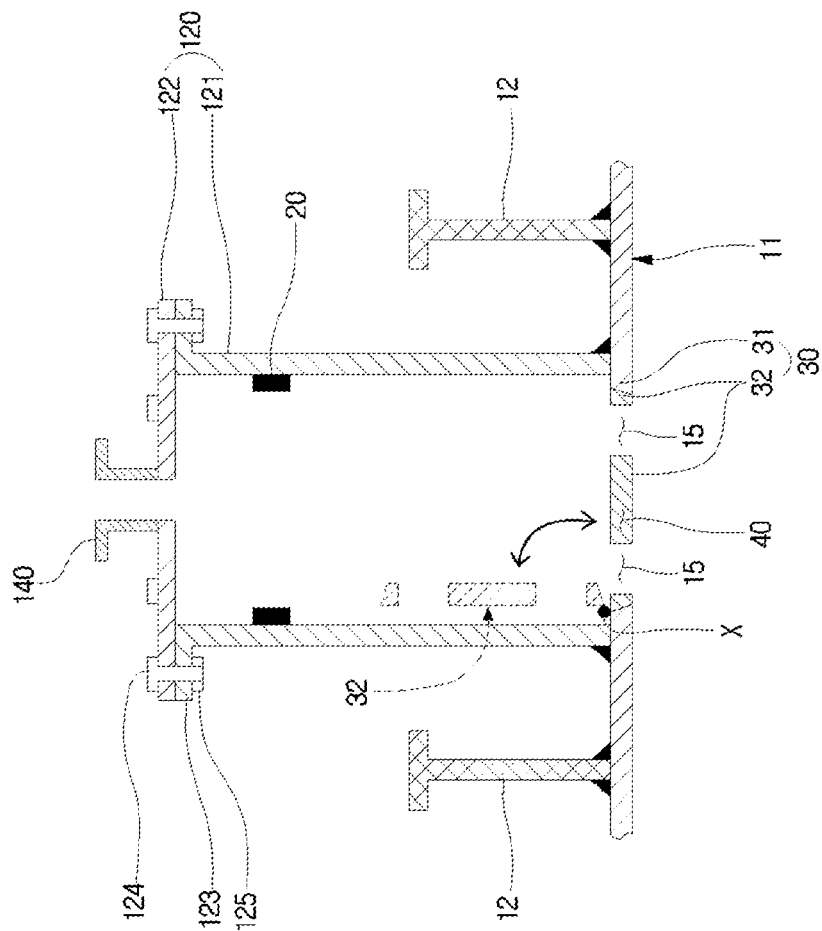
FIG. 14 is a view for describing a frictional resistance-reducing device according to a fifth embodiment of the present invention.

FIG. 14 is a view for describing a frictional resistance-reducing device according to a fifth embodiment of the present invention. For convenience of description, the following description will focus on differences with descriptions based on FIGS. 10 to 13.

Referring to FIG. 14, in the frictional resistance-reducing device according to the fifth embodiment of the present invention, a door unit 32 may be hinge-coupled to the base unit 31. That is, the door unit 32 may be hinge-coupled to the base unit 31 to rotate in the housing 120. In this case, a hinge axis X may be located in the housing 120. The hinge axis X may be located in the housing 120. In this case, a portion exposed to the outside of the outer panel 11 may be minimized.

Further, a boundary part of the door unit 32 and a boundary part of the through hole 40 may have a tapered shape to prevent the door unit 32 from rotating outside the housing 120.

When the door unit 32 hinge-coupled to the base unit 31 is closed, the door unit 32 may be coupled to the base unit 31 in a bolt-coupling method, as shown in FIG. 13.

Figure 15:
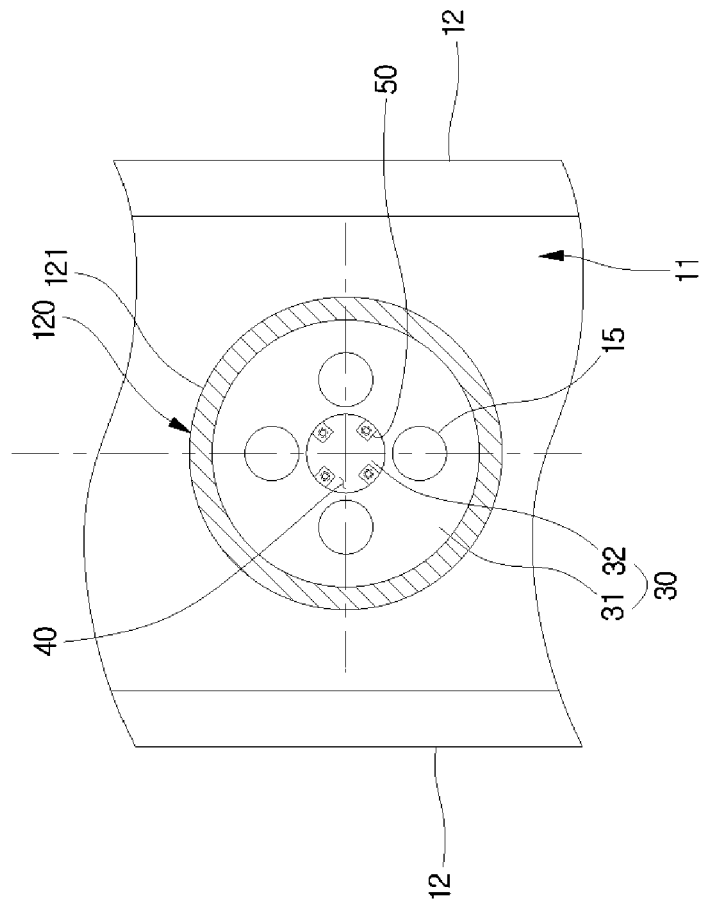
FIG. 15 is a view for describing a frictional resistance-reducing device according to a sixth embodiment of the present invention.
Figure 16:
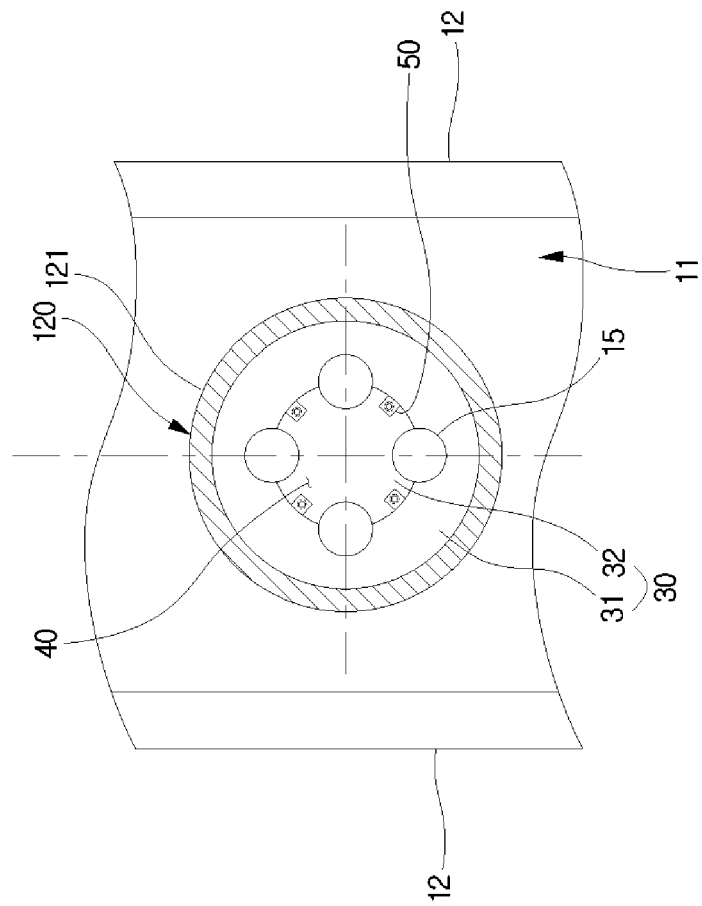
FIG. 16 is a view for describing a frictional resistance-reducing device according to a seventh embodiment of the present invention.

FIG. 15 is a view for describing a frictional resistance-reducing device according to a sixth embodiment of the present invention, and FIG. 16 is a view for describing a frictional resistance-reducing device according to a seventh embodiment of the present invention. For convenience of description, the following description will focus on differences with descriptions based on FIGS. 10 to 13.

In the frictional resistance-reducing device according to the sixth embodiment of the present invention, the air outlet 15 may be formed on the base unit 31, as shown in FIG. 15.

In the frictional resistance-reducing device according to the sixth embodiment of the present invention, as shown in FIG. 16, the air outlet 15 may be formed in both the base unit 31 and the door unit 32. That is, the air outlet 15 may be formed at a boundary between the base unit 31 and the door unit 32.

Embodiments of the present invention have been described above, but it should be understood by those skilled in the art that various changes and modifications may be made therein by addition, substitution, or removal of components without departing from the spirit and scope of the present invention as defined by the appended claims. Such changed and modified embodiments are also included within the scope of the appended claims.

DESCRIPTION OF SYMBOLS

10: HULL
11: OUTER PANEL
12: REINFORCEMENT MEMBERS
15: AIR OUTLET
20: ANODE
30: SPECIFIC AREA
31: BASE UNIT
32: DOOR UNIT
40: THROUGH HOLE
50: SUPPORT UNIT
100, 200, 300: FRICTIONAL RESISTANCE-REDUCING DEVICE
120, 220, 320: HOUSING
121: BODY UNIT
122: COVER UNIT
123: FLANGE
123 124: BOLT
125: NUT
126: LARGE DIAMETER PART
127: SMALL DIAMETER PART
128: DIAMETER CHANGING PART
130: AIR INLET
140: CONNECTION UNIT

It is claimed:

1. A ship comprising:
an outer panel including an air outlet;
a plurality of reinforcement members installed on an inner surface of the outer panel to be separated from each other; and
a frictional resistance-reducing device formed between the immediately adjacent reinforcement members among the plurality of reinforcement members on the inner surface of the outer panel to cover the air outlet,
wherein the frictional resistance-reducing device includes a housing having a hollow shape with one surface that is open, and an air inlet formed in the housing,
wherein the one open surface faces the air outlet,
wherein the housing includes a body unit having a hollow shape with both side surfaces open, and one of the surfaces thereof perpendicularly coupled to the inner surface of the outer panel, and
wherein the body unit includes a diameter changing part configured to have a cone shape with a changing diameter.

2. The ship of claim 1, wherein:
the air outlet includes a plurality of air outlets;
the housing is perpendicularly coupled to the inner surface of the outer panel;
the air inlet is formed in the other surface or a side surface of the housing; and
the plurality of air outlets are disposed in the outer panel at regular intervals with respect to a virtual line in a circumferential direction.

3. The ship of claim 1, wherein the housing further includes:
a cover unit having an air inlet formed in the center thereof and configured to cover the other surface of the body unit.

4. The ship of claim 3, wherein the body unit includes:
a large diameter part having a cylinder shape;
a small diameter part having a cylinder shape with a diameter relatively smaller than that of the large diameter; and
the diameter changing part configured to connect the large diameter part with the small diameter part.

5. The ship of claim 2, wherein:
the housing has a regular polygon-shaped cross section; and
the number of the plurality of air outlets is provided to be the same as that of sides of the regular polygon-shaped cross section of the housing.

6. The ship of claim 1, wherein:
the housing has a rectangular cross section and is perpendicularly coupled to the inner side surface of the outer panel;
the air inlet is formed in the center of the other surface of the housing; and
a plurality of air outlets are disposed at an edge of the housing and positioned to be perpendicular to the outer panel at a regular distance from a virtual line.

7. The ship of claim 1, wherein the housing includes a plurality of housings, and the plurality of housings are disposed in a longitudinal direction of the reinforcement member or a direction perpendicular to the longitudinal direction of the reinforcement member.

8. A ship comprising:
an outer panel including an air outlet;
a plurality of reinforcement members installed on an inner surface of the outer panel to be separated from each other; and
a frictional resistance-reducing device formed between the immediately adjacent reinforcement members among the plurality of reinforcement members on the inner surface of the outer panel to cover the air outlet,
wherein the frictional resistance-reducing device includes a housing having a hollow shape with one surface that is open, and an air inlet formed in the housing,
wherein the one open surface faces the air outlet, and
wherein a specific area of the outer panel facing the one open surface of the housing includes a base unit having a through hole connected with an inside of the housing, and a door unit coupled to the base unit to open and close the through hole.

9. The ship of claim 8, wherein the air outlet is formed in at least one location among the door unit, the base unit, and a boundary between the base unit and the door unit.

10. The ship of claim 8, wherein the door unit is hinge-coupled to the base unit to rotate toward the inside of the housing.

11. The ship of claim 10, wherein a boundary part of the door unit and a boundary part of the through hole have a tapered shape to prevent the door unit from rotating outside the housing.

12. A frictional resistance-reducing device comprising:
a housing having a hollow shape with one surface that is open; and
an air inlet formed at one side of the housing,
wherein the one open surface of the housing is installed to face an inner surface of an outer panel, reinforcement members reinforcing the outer panel are disposed on both sides of the housing, and the housing covers an air outlet installed in the outer panel, and wherein a specific area of the outer panel facing the one open surface of the housing includes a base unit having a through hole connected with an inside of the housing, and a door unit coupled to the base unit to open or close the through hole.

13. The frictional resistance-reducing device of claim 12, wherein the housing includes:

a body unit having a hollow shape with both side surfaces open and having one of the surfaces thereof perpendicularly coupled to the inner surface of the outer panel; and a cover unit having an air inlet formed in the center thereof and configured to cover the other surface of the body unit.

14. The frictional resistance-reducing device of claim 12, wherein the housing includes an antifouling device installed therein.

* * * * *